United States Patent
Vija et al.

(10) Patent No.: US 7,723,674 B2
(45) Date of Patent: May 25, 2010

(54) ATTENUATION CORRECTION FOR SPECT IMAGING USING NON-CLASSICAL ORBITS OF MANY SMALL GAMMA CAMERAS

(75) Inventors: A Hans Vija, Evanston, IL (US); James T. Chapman, Glen Ellyn, IL (US); John Thomas Pawlak, Villa Park, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 264 days.

(21) Appl. No.: 11/524,800

(22) Filed: Sep. 21, 2006

(65) Prior Publication Data

US 2008/0073539 A1 Mar. 27, 2008

(51) Int. Cl.
*G12B 13/00* (2006.01)
(52) U.S. Cl. ................................... 250/252.1
(58) Field of Classification Search ............... 250/252.1, 250/370.09; 378/195, 196, 197, 198
See application file for complete search history.

(56) References Cited

U.S. PATENT DOCUMENTS

| | | | |
|---|---|---|---|
| 2,862,333 | A | 12/1958 | Gardiol |
| 4,613,122 | A | 9/1986 | Manabee |
| 4,645,933 | A | 2/1987 | Gambini et al. |
| 4,652,758 | A | 3/1987 | Barfod |
| 4,652,759 | A | 3/1987 | Platz |
| 5,519,222 | A | 5/1996 | Besett |
| 5,757,006 | A | 5/1998 | DeVito et al. |
| 5,923,038 | A | 7/1999 | DiFillippo |
| 6,147,352 | A | 11/2000 | Ashburn |
| 6,150,662 | A | 11/2000 | Hug et al. |
| 6,184,530 | B1 | 2/2001 | Hines et al. |
| 6,211,523 | B1 | 4/2001 | Gagnon |
| 6,242,743 | B1 | 6/2001 | DeVito et al. |
| 6,388,244 | B1 * | 5/2002 | Gagnon ............... 250/208.1 |
| 6,664,542 | B2 * | 12/2003 | Ye et al. ............... 250/363.04 |
| 6,774,371 | B2 | 8/2004 | Garrad et al. |
| 6,927,395 | B2 | 8/2005 | Koops et al. |
| 7,105,825 | B2 | 9/2006 | Juni |
| 7,108,421 | B2 | 9/2006 | Gregerson et al. |

(Continued)

FOREIGN PATENT DOCUMENTS

WO WO2004096050 4/2004

OTHER PUBLICATIONS

Hawman, et al. "The Cardiofocal collimator: a variable-focus collimator for cardiac SPECT", 1994, Phys. Med. Biol., vol. 39, pp. 439-450.

(Continued)

*Primary Examiner*—David P Porta
*Assistant Examiner*—David S Baker
(74) *Attorney, Agent, or Firm*—Peter L. Kendall

(57) ABSTRACT

Attenuation correction data is obtained from one or more transmission sources to calculate the attenuation factors of a reconstruction area of an object being imaged by a nuclear medicine apparatus, such as a SPECT gamma camera. The transmission sources are capable of swiveling the direction of the transmission to correspond with the direction of capture of the gamma detectors. Additionally, the transmission sources are capable of linear movement to correspond with any linear movement of the detectors. The transmission sources are able to follow the same path as the detectors in order to determine the attenuation factors through the same reconstruction area being scanned by the detectors.

25 Claims, 1 Drawing Sheet

U.S. PATENT DOCUMENTS

| | | |
|---|---|---|
| 7,242,002 B2 | 7/2007 | Blevis et al. |
| 7,297,956 B2 | 11/2007 | Fenster et al. |
| 2003/0111608 A1 | 6/2003 | Dulmen et al. |
| 2003/0230724 A1 | 12/2003 | Koops et al. |
| 2004/0013225 A1 | 1/2004 | Gregerson et al. |
| 2004/0013239 A1 | 1/2004 | Gregerson et al. |
| 2004/0042582 A1 | 3/2004 | Ein-Gal |
| 2004/0251419 A1 | 12/2004 | Nelson et al. |
| 2004/0262525 A1 | 12/2004 | Yunker et al. |
| 2006/0056581 A1 | 3/2006 | Hoffman et al. |
| 2006/0180766 A1 | 8/2006 | DiFilippo |
| 2006/0202650 A1 | 9/2006 | Hausner et al. |
| 2008/0007359 A1 | 3/2008 | Vija |
| 2008/0073540 A1 | 3/2008 | Vija |
| 2008/0073541 A1 | 3/2008 | Vija |

OTHER PUBLICATIONS

Palmer, et al. "Pinhole emission computed tomography: method and experimental evaluation", 1990, Phys. Med. Biol., vol. 35, No. 3, pp. 339-350.

Orlov, Theory of three dimensional reconstruction ii: the recovery of operator, Soviet Phys. Crystallogr, 20:429-433 (1976).

Natterer, et al., "Mathematical Methods in Image Reconstruction", SIAM, Philadelphia, Pa. (2001).

"O-Arm Imaging System", Medgadget, Retrieved [Mar. 4, 2010], Retrieved from URL: <medgadget.com/archives/print/002335print.html>, Published [Jul. 10, 2006].

* cited by examiner

ATTENUATION CORRECTION FOR SPECT IMAGING USING NON-CLASSICAL ORBITS OF MANY SMALL GAMMA CAMERAS

BACKGROUND OF THE INVENTION

1. Field of the Invention

This disclosure relates generally to tomographic imaging, and in particular to attenuation correction for gamma ray detection in a gamma camera.

2. Introduction

In conventional gamma cameras such as Anger cameras known in the art, a single radiation detector having a planar surface is employed for detecting gamma rays for tomographic imaging. A radiopharmaceutical or radioisotope (for example, Tc-99m or Tl-201), chosen for its affinity for a particular region of the body, is administered to the patient. The radiopharmaceutical or radioisotope emits gamma rays in all directions that are detected by gamma cameras.

The system accumulates counts of gamma photons that are absorbed by a crystal in the gamma camera detectors, usually a large flat crystal of sodium iodide with thallium doping in a light-sealed housing. The crystal scintillates in response to incident gamma radiation: when the energy of an absorbed gamma photon is released, a faint flash of light is produced. This phenomenon is similar to the photoelectric effect. Photomultiplier tubes (PMT) behind the crystal detect the fluorescent flashes and convert them into electrical signals, and a computer sums the fluorescent counts. The computer in turn constructs and displays a two dimensional image of the relative spatial count density or distribution on a monitor. This image then reflects the distribution and relative concentration of radioactive tracer elements present in the organs and tissues imaged.

Between the gamma camera detector and the emission source is usually a collimator. The collimator's function is to allow only gamma rays that are traveling perpendicular to the surface of the detector to reach the detector. The collimator is constructed of a dense, high-atomic-number material, such as lead. The material is bored with numerous tiny straight holes, which allow parallel gamma rays to pass through. If the gamma ray is not traveling along the path of the hole then it will be absorbed by the material and will not reach the detector. It is for this reason that the direction the detector faces is important.

In order to obtain spatial information about the gamma emissions from an imaging object a method of correlating the detected photons with their point of origin is required. Single Photon Emission Computed Tomography (SPECT) captures multiple images from multiple angles in order to make a three-dimensional representation of the object under observation. The area to be imaged is generally called the reconstruction area, since the data gathered by the gamma detectors is used to reconstruct an image of the object. The object to be imaged is located inside of the reconstruction area.

One issue with SPECT imaging is the fact that as the gamma rays travel through the body, they become attenuated. A significant portion of the emitted photons are obstructed from reaching the detectors by colliding with atoms. When this occurs, one significant possibility is a course alteration away from the detector that may result in a missed detection. The degree of attenuation depends upon the amount and density of matter between the emitting source and the detector, and will vary from subject to subject according to body composition. The more attenuation present, the more probable will be an inaccurate reconstruction of image data.

Unless the amount of attenuation is known, the detected activity within a defined energy window underestimates the true activity. This results in poorer contrast and attenuation artifacts in the reconstructed images. Conditions such as these reduce the confidence one may have in extracting information for diagnosis.

One method to compensate for this attenuation is by approximating the amount of attenuation based on the tissue depth of the emitting source and using estimated attenuation values for certain tissues. This approach is easy to perform, but it is only an approximation and does not provide a very accurate attenuation factor. To get a more accurate attenuation factor, one must use a known transmission source from outside the body, such as an x-ray or gamma source (such as Gd-153) to transmit external radiation through the reconstruction area and then measure the attenuation of the transmitted source by the reconstruction area.

It is known to measure the actual attenuation coefficients of body tissues by placing a line source of gamma radiation on one side of the body and measuring the transmission of the gamma radiation through the body as a function of direction, i.e. collecting transmission CT data, as the line source is scanned across the patient's body. See, e.g. U.S. Pat. No. 5,576,545 (Stoub et al.) incorporated herein by reference in its entirety.

The traditional method for SPECT used large fixed-angle detectors attached to a stationary gantry. The detector was not able to alter its viewing angle independent of its movement along the gantry. The gantry provides the detectors with the structural support needed to orbit about the patient. The orbiting of the detectors is necessary in order to obtain enough information to accurately reconstruct a three dimensional image of the patient or object being observed.

Another more modern approach to tomographic imaging uses multiple smaller, articulating detectors that are able to swivel or pivot, so that the detector face can sweep across a larger area at each reconstruction angle. See, e.g., U.S. Pat. No. 5,757,006 to DeVito et al., and U.S. Pat. No. 6,242,743 to DeVito et al. Such articulating detectors can thus acquire projection data from areas outside the plane of the gantry. Some detectors combine the two elements so that articulating detectors are also able to move linearly to further enhance the viewing angle of the detector. Further, approaches such as disclosed in the '743 patent provide multiple small, articulating detectors completely surrounding a patient such that no orbiting of the detectors about the patient is necessary, as all the multi-angle information may be obtained simultaneously.

The prior art approaches to attenuation correction, such as, e.g., fan-beam collimated sources, scanning sources, and profile typing, have been developed for the traditional, large fixed-angle detectors with stationary gantries. These approaches are not compatible with the modern, small articulating multiple detector approach. The present invention improves upon existing prior art by using a system that can determine an accurate attenuation factor that can be used with both the traditional and modern approaches to SPECT imaging.

SUMMARY OF THE INVENTION

The present invention uses a single or a plurality of small transmission sources to calculate the attenuation factors of the reconstruction area. The transmission sources are capable of swiveling the direction of the transmission to correspond with the direction of capture of the gamma detectors. Additionally, the transmission sources are capable of linear movement to correspond with any linear movement of the detectors. Essentially, the transmission sources are able to follow the same path as the detectors in order to determine the attenuation factors through the same reconstruction area being scanned by the detectors.

The transmission sources (e.g. X-ray or gamma ray) are collimated similarly to the detectors in order to focus the transmission direction linearly. To detect the transmissions, an array of gamma cameras is positioned opposite of the transmission sources. Once the transmission sources are detected, the results are stored by a connected computer system. By processing the data, the computer system is able to create an attenuation map for the reconstruction area. The system can then compare the attenuation map with the data from the SPECT acquisition in order to accurately correct for attenuation errors in the acquired SPECT projection data.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

In order that the invention may be more clearly understood, the embodiments thereof will now be described in detail by way of example, with reference to the accompanying drawings, in which.

DETAILED DESCRIPTION OF THE PREFERRED EMBODIMENTS

Figure 1:
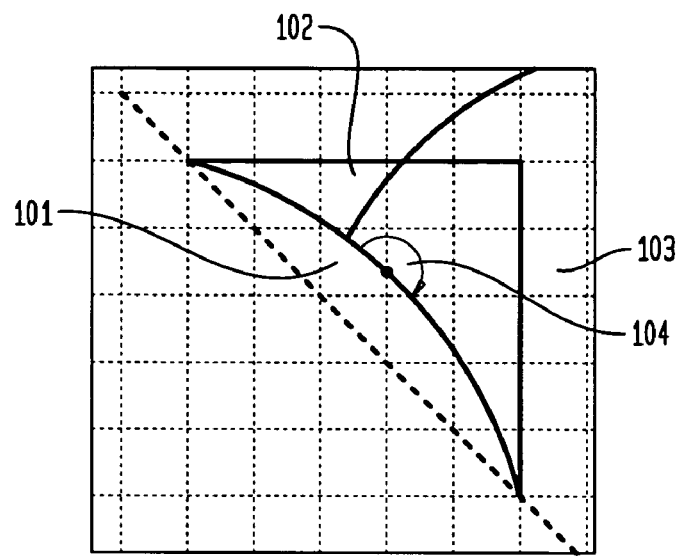
FIG. 1 is an example of a reconstruction area under examination, in accordance with the present invention.

Referring to the drawings, FIG. 1 shows a reconstruction area 101 between two detector planes (or lines) 102 and 103, which is to be imaged by a SPECT imaging apparatus about a center of rotation 104. Inside of the reconstruction area is the object (patient) to be observed. The object to be imaged will contain an emitting source of radiation that has been injected into or ingested by the object in the form or a radiopharmaceutical, with a radiation distribution field in the reconstruction area. The reconstruction area is defined as being that area in which point or pixel to be imaged can be seen by a minimum of 180° line pairs. Either a single orbiting detector or a plurality of rotating, orbiting or non-orbiting detectors rotates about or points towards the center of rotation 104 of reconstruction area to acquire signals from emitted photons to be used in the SPECT imaging reconstruction.

For attenuation correction, a transmission source needs to cover the same reconstruction area or space. For example, tomographic imaging requires a three-dimensional space, while planar imaging utilizes a two-dimensional space. The transmission source for attenuation correction thus may comprise a line source for generating three-dimensional attenuation factors, in which case the line transmission source moves along a plane, or a point source for generating two-dimensional attenuation correction factors, in which case the point transmission source moves along a line. In each case, the transmission sources are pivotable or capable of swiveling motion, such that the transmission radiation flux (whether parallel or otherwise) always points to the effective center of rotation of the detectors about the object or patient being imaged.

Figure 2:
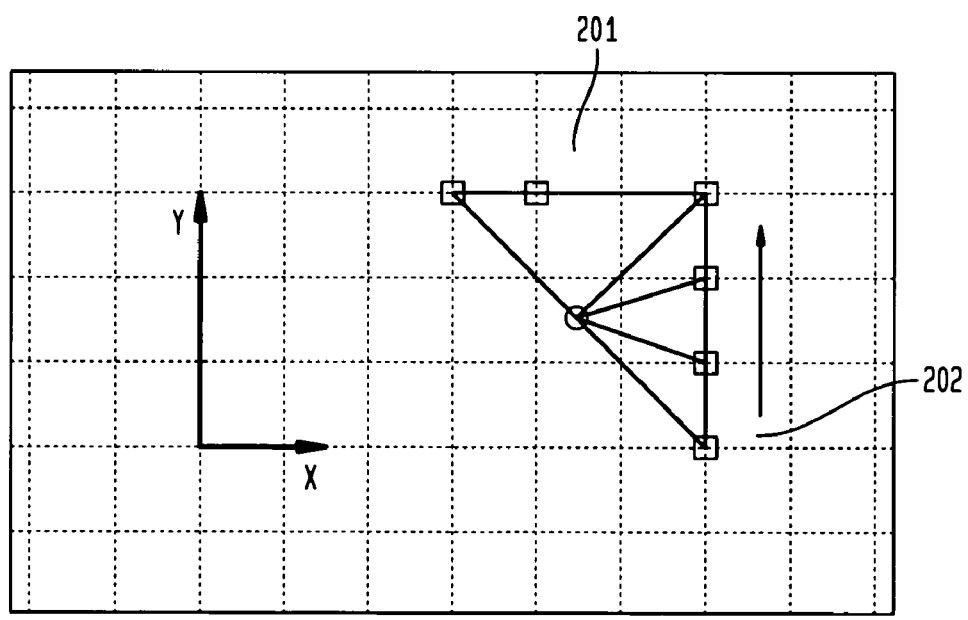
FIG. 2 is an example of a plurality of transmission sources used for tomographic sampling in order to calculate attenuation factors for a reconstruction area, in accordance with the present invention.

FIG. 2 is a diagram of one embodiment of the present invention. A first transmission source 201 moves linearly along an x-axis of a gantry, and a second transmission source 202 moves linearly along a y-axis. In this embodiment, the y-axis track and x-axis track do not need to be physically connected to one another. One transmission source moves linearly along the y-axis, while the second transmission sources moves linearly across the x-axis. The transmission sources are composed of either a point source or a line source of radioactive material, such as a collimated X-ray or gamma ray source. For example, the transmission source may comprise a source Gd-153 radiation. Compared to the radioactive material used in the SPECT emissions (like Tc-99m or Tl-201), the radioactive transmission material has a different energy level and generally a much longer half-life.

A transmission source's movement is controlled by two articulation members (not shown). The first articulation member controls the translational movement of the transmission source. It moves the transmission source linearly along an axis of the gantry to which the transmission source is connected. The second articulation member controls the swivel motion of the transmission source. The swivel motion alters the direction of transmission independent of any movement of the transmission source along the corresponding axis of the gantry. Also, the swivel motion allows the transmission to be in a direction above or below the plane formed by the gantry. As explained above, this swivel motion is used to keep the direction of the transmission source pointed towards the effective center of rotation of the detectors about the reconstruction area at issue, such that the transmission source radiation is detected by detectors positioned to view the reconstruction area.

The movement of the transmission sources and the recording of the transmission data are controlled by a control apparatus such as a computer. Once the procedure has begun, the computer will determine the time each transmission source must remain in place in order to get an accurate reading. After the transmission data are recorded, the computer will move the transmission sources to the next location and/or face them in the correct direction to perform the next scan, with opposing detectors in an appropriate position to detect the transmission radiation through the object. This process is repeated until the entire reconstruction area has been scanned, either completely, or sufficiently for the purpose of developing attenuation correction factors.

Alternatively, it may be possible to provide a single point or line transmission source that is translated along both the x-axis as well as the y-axis. Referring to FIG. 2, the transmission source 202 may first travel upwards along the y-axis portion of the gantry, with appropriate pivot or swivel motion being applied. When the source 202 reaches the intersection or origin of the x- and y-axes, it may change direction of linear movement by ninety degrees to travel along the second x-axis portion of the gantry. Given this range of motion, the single transmission source is able to travel one hundred an eighty degrees around the reconstruction area. Additionally, while the x- and y-axes are shown as being orthogonal axes of a spatial coordinate system defining the reconstruction area, it is not necessary for the two axes to be orthogonal. Instead, it is necessary only for the two axes to be non-colinear.

Using either of these two embodiments enables transmission source coverage of at least one hundred and eighty degrees around the reconstruction area. This allows for sufficient sampling to create an attenuation map to eliminate or reduce attenuation distortion.

Alternatively, a second set of arms may be employed so that the transmission sources will be allowed to move about a three hundred and sixty degree orbit around the reconstruction area. This embodiment would employ one to four arms, which may be all physically connected, separated, or any combination of the two. For instance, the device could comprise one single interconnected arm that would allow a single transmission source to completely orbit the object reconstruction area. As another example, it could have 2 arms, each covering one hundred and eighty degrees.

Alternatively, one arm could cover two hundred and seventy degrees while the other arm covers ninety degrees.

However, each physically separated arm must have at least one transmission source attached to it. Therefore, depending on the physical connections between the arms, the minimum number of transmission sources required will be either: one, two, three, or four. This embodiment enables the device to obtain a complete three hundred and sixty degree sampling of the reconstruction area to provide for complete attenuation correction.

In addition to or in combination with the linear motion described above, the transmission sources are also able to swivel or pivot about the direction of their linear motion. The swiveling motion is accomplished by means of a second articulation member. By swiveling, the transmission source can sweep across more of the reconstruction area. This technique allows the transmission sources to cover gaps that may otherwise appear, or to point the transmission source towards a reconstruction area that is not within the plane formed by the gantry. The second articulation member that performs the swiveling motion is completely independent of the first articulation member that performs the translational movement. Therefore the two types of motion can be performed independently of each other.

In a particularly preferred embodiment, as the plurality of transmission sources move linearly along the arms they continually swivel their direction so that their transmission direction is always pointed at the center of rotation of the detectors about the object or patient reconstruction area. The center of rotation should be approximately the center of the reconstruction area.

The electromagnetic flux of the transmission sources travels into the reconstruction area of the object and then emerges from the object until it hits a detector on the other side of the reconstruction area. The detector crystal scintillates in response to incident gamma radiation. This scintillation releases a faint flash of light due to the energy created when the crystal absorbs a photon. PMTs behind the crystal detect the fluorescent flashes and then a computer sums the fluorescent counts.

The detectors used to detect the transmission are the same detectors used to detect emissions for the SPECT imaging. However, it is possible that a separate set of detectors be provided expressly to detect the transmission. In either case, the detectors can differentiate transmission photons from emission photons due to the different photon energy levels of the two since the types of radioactive isotopes used for the emission (typically, Tc-99m or Tl-201) and transmission (such as Gd-153) sources differ.

By using the same set of detectors for the SPECT and attenuation correction, the two procedures may be performed simultaneously which enhances the throughput and also the accuracy of the final results by reducing potential for artifacts caused by patient movement. It also increases the reliability of matching the proper attenuation correction data to the corresponding SPECT data.

After the computer registers all the signals received by the detector, it must compute the attenuation map of attenuation correction factors, which are used to correct the raw projection data received. Once all the two dimensional data is captured, the data is processed by a computer program to calculate a three dimensional representation of the attenuation values throughout reconstruction area. This three dimensional representation is known as the attenuation map. This data is used in combination with the data from the SPECT scan to correct for attenuation errors in the SPECT image.

What is claimed is:

1. A method for obtaining transmission radiation samples for attenuation correction over a reconstruction area of an object to be imaged by a nuclear medicine imaging apparatus, comprising the steps of:
    moving a transmission source along a first axis defining spatial coordinates of said reconstruction area;
    moving a transmission source along a second axis defining spatial coordinates of said reconstruction area, wherein said second axis is non-colinear with said first axis;
    detecting transmission radiation passing through said reconstruction area from a plurality of positions along said first and second axes using a detector; and
    using said detected transmission radiation to obtain attenuation correction factors for correcting emission radiation data obtained from emission radiation emanating from said object;
    wherein during the step of moving a transmission source along a first axis, the transmission source independent of motion of a central axis rotably swivels its direction so that its transmission direction is always pointed at a center of rotation of the detector about the reconstruction area.

2. The method of claim 1, wherein said second axis is orthogonal to said first axis.

3. The method of claim 1, wherein separate transmission sources are provided for said first and second axes.

4. The method of claim 1, wherein the same transmission source is provided for motion along said first and second axes.

5. The method of claim 1, wherein transmission radiation is detected over at least 180°.

6. The method of claim 1, wherein transmission radiation from an X-ray source is detected.

7. The method of claim 6, wherein said X-ray source is collimated.

8. The method of claim 1, wherein transmission radiation from a gamma-ray source is detected.

9. The method of claim 8, wherein said gamma-ray source is collimated.

10. The method of claim 1, wherein during the step of moving a transmission source along a second axis, the transmission source independent of motion of a central axis rotably swivels its direction such that transmission radiation from said source is pointed at an effective center of rotation of imaging detectors around said reconstruction area.

11. The method of claim 1, wherein a transmission source is a point source of radiation.

12. The method of claim 1, wherein a transmission source is a line source of radiation.

13. The method of claim 1, further comprising the step of moving a transmission source along a third axis non-colinear with at least one of said first and second axes and detecting transmission radiation therefrom passing through an object in said reconstruction area.

14. The method of claim 13, further comprising the step of moving a transmission source along a fourth axis non-colinear with said third axis and detecting transmission radiation therefrom passing through an object in said reconstruction area.

15. Apparatus for obtaining transmission radiation data from transmission source radiation for generation of attenuation correction factors used in nuclear medicine imaging, comprising:
- a first transmission source of radiation;
- at least two non-colinear axes along which said first transmission source is movable; and
- at least one detector for detecting transmission radiation from said at least one transmission source at a plurality of positions of said transmission source along each of said axes
- wherein the first transmission source of radiation independent of motion of a central axis rotably swivels so that its transmission direction is always pointed at a center of rotation of the detector about the reconstruction area.

16. Apparatus according to claim 15, wherein said non-colinear axes define a spatial coordinate system of a reconstruction space of an object to be imaged.

17. Apparatus according to claim 16, wherein said non-colinear axes are orthogonal to each other.

18. Apparatus according to claim 15, wherein said transmission source is an X-ray source.

19. Apparatus according to claim 15, wherein said transmission source is a gamma-ray source.

20. Apparatus according to claim 15, wherein said transmission source is a point source.

21. Apparatus according to claim 15, wherein said transmission source is a line source.

22. Apparatus according to claim 15, further comprising a second transmission source, wherein said first transmission is movable along one of said axes and said second transmission source is movable along the other of said axes.

23. Apparatus according to claim 15, further comprising third and fourth non- colinear axes, along which at least a second transmission source is movable.

24. Apparatus according to claim 15, wherein said first transmission source is capable of pivot or swivel motion about said axes, said pivot or swivel motion being independent of the movement of the first transmission source along said non-co-linear axes.

25. Apparatus according to claim 23, wherein said second transmission source is capable of pivot or swivel motion about said axes, said pivot or swivel motion of said second transmission source being independent of the movement of said second transmission source along said third and fourth non-colinear axes.

* * * * *